R. d'HEUREUSE.

GERMINATING OR GROWING GRAIN OR SEEDS FOR MALTING OR OTHER PURPOSES

No. 179,700. Patented July 11, 1876.

Witnesses;

Inventor;

UNITED STATES PATENT OFFICE.

RUDOLPH D'HEUREUSE, OF NEW YORK, N. Y.

IMPROVEMENT IN GERMINATING OR GROWING GRAIN OR SEEDS FOR MALTING OR OTHER PURPOSES.

Specification forming part of Letters Patent No. 179,700, dated July 11, 1876; application filed October 15, 1875.

*To all whom it may concern:*

Be it known that I, RUDOLPH D'HEUREUSE, of the city, county, and State of New York, have made certain Improvements in Apparatus and Process for Germinating Grains and Seeds for Malting; and I do declare that the following is a full, clear, and exact description of the same, reference being had to the accompanying drawings, and letters of reference marked thereon, and in which—

Figure 1:
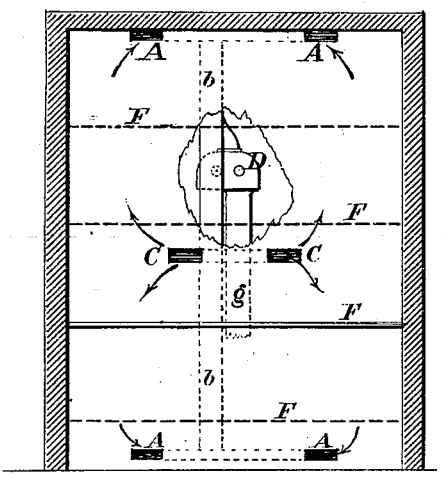
Figure 2:
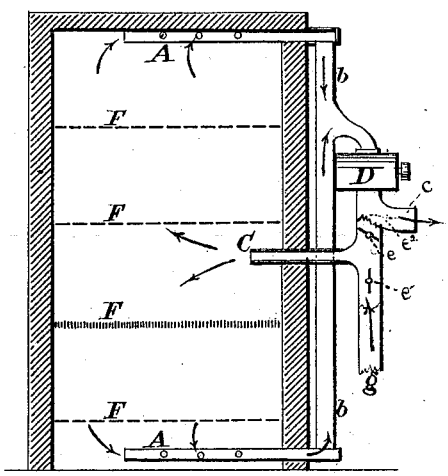
Figure 3:
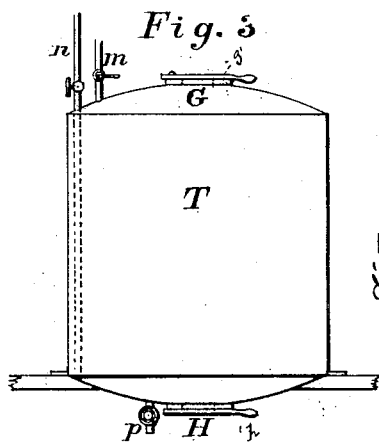

Figure 1 is a sectional front elevation of the germinating-room; Fig. 2, a sectional side elevation of the same; Fig. 3, a perspective of stationary steeping-tank, and Fig. 4 a perspective of revolving steeping-tank.

The first part of my invention relates to the steeping process; and it consists in subjecting the grain or cereals in a steeping-tank to the action of water holding a quantity of mineral matter, such as phosphates, ammoniates, calcium compounds, and the like; and in subjecting the grain in said tank to an increased or to a reduced pressure of air, by reason whereof the water more thoroughly permeates the grain. It also consists in the addition of chlorine or ozone to the steep-water for the purpose of bleaching the grain, and in the construction of a tank necessary for carrying out this first part of the process.

The second part of my invention relates to the germinating process as carried on in the sprouting-room, and to the devices connected with the room, whereby the admission of air thereto is controlled, and whereby other ends hereinafter set forth are accomplished.

Before proceeding to describe the first part of my process, I will premise that, in order to insure a healthy development of the germ in grains, it is essential that the grain should contain certain mineral substances, such as phosphates, ammoniates, calcium compounds, and the like, and as grain used for malting and other kindred purposes is frequently found lacking in these substances, I propose to supply the desideratum. This I do by adding to the steep-water in which the grain is treated in the preparatory steps to accelerate germination a certain proportion of the aforesaid minerals, say, one part of soluble phosphate of lime, of potash or of soda, carbonate or nitrate of ammonia, to two hundred parts of water. I give this as the strength of a solution generally found sufficient, but do not confine myself to it, as a stronger solution can sometimes be used, say, one part of the minerals to fifty parts of water. The more effectually to infuse the germ of life into the grain I reduce the pressure of air in the close tank containing the grain and steep-water by exhausting the air from the tank with any suitable air-exhausting device, and as a result I have the grain deprived of so much air, so that, when the pressure of the air is raised, more of the steep-water with its nutritious minerals permeates the grain than could have entered had not the grain been deprived of the air. Instead of a reduced pressure of the air, or subsequently, and in addition thereto, a higher pressure than the ordinary atmospheric pressure produced in the closed tank, will accelerate the penetration of the steep-water into the grain.

The value of the grain depends greatly on its color, a light color being preferred, and as grain used for malting is frequently stained I propose to bleach it with chlorine or ozone, the chlorine or ozone being used in the steeping-tank with the water; or, after the grain is removed from the tank, it may be treated with chlorine or ozone in its gaseous state. An excess of chlorine can be removed by subsequent washing, though a very small proportion remaining in the grain acts rather favorably in accelerating the subsequent germination.

Figure 4:
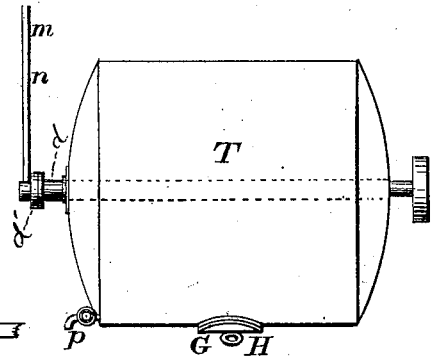

In carrying out this first part of my process I use a close tank, T, Figs. 3 and 4, provided with an opening, G, for charging the tank with the grain, and with an opening, H, for discharging the same. The water, with which may have been previously combined the mineral substances above referred to, enters the tank by pipe *m*. *n* is a pipe which connects with any suitable air exhausting and impelling device, say, a "Root blower," and leads into the steeping-tank T, into which or from which the air is to be impelled or exhausted. Water and air may be introduced into the revolving tank T through pipe *m n*, the said pipe entering the hollow shaft *d* of said revolving tank. If the shaft passes clear through the tank it should be perforated for the escape of air into or from the tank. If it does not pass through the tank, that part of it with which connects the air-pipe $m\ n$ opens directly into the tank. The connection between the pipe $m\ n$ and hollow shaft or axle $d$ is made by passing the pipe into the shaft, the pipe being smaller in circumference than the shaft, so that the shaft may turn freely upon it, and the jointure of the pipe and shaft made air-tight by a collar, $d'$. The openings G H in tanks T are provided with coverings $g'\ h$, respectively. In the tanks each pipe is provided with a stopcock, and $p\ p$ represent faucets for drawing water from the tanks.

Before proceeding to describe the second part of my invention I will state that the air admitted into the germinating or sprouting room is tempered and moistened by passing the same through or over the surface of suitably-tempered water. This is done that the grain in the room may be kept at a temperature and moisture most favorable to the germination of the grain. A temperature from 60° to 70° Fahrenheit will generally be found sufficient. If, however, the grain in the sprouting-room is sufficiently moist, or excessively so, dry air is admitted instead of moistened air. When dry air is used, the same is tempered by passing it through tempered water, as before stated, it being understood that to pass it through the body of the water a tube or tubes must run through the same in order to form a conduit for the air. If the temperature of the room and the grain in the room be such that it is not necessary to temper the air before its introduction into the sprouting-room, the air need not be passed through tempered water, or otherwise tempered. It is hardly necessary to state that the air may be tempered in other ways than by passing it through tempered water, for it can be tempered by any of the well-known methods of tempering air, and that the air to be used, instead of being tempered, can be cooled if it be necessary at any time to use cool air. Apparatus for this purpose being well known, none need be described.

I will now proceed to describe a piece of mechanism adapted to carry out the process of treating the grain with tempered and moistened air. In the drawing, Figs. 1 and 2, B represents the sprouting-room with the floors F made of wood or metal perforated, or having openings for the passage of currents of air through the grain resting on the floors. The pipe $g$ connects with a vessel (not shown in the drawing,) suitable for holding and heating water, and having an opening or openings for the admission of air into the same.

If moistened air is to be used, after it has been impelled or drawn over the surface of or through water heated in a vessel such as just described, it is further impelled or drawn by a suitable device—say a Root blower—through pipe $g$, and impelled through pipe C into the germinating-room B, and, after circulating through the steeped grain resting on the perforated floors in the said room, it is drawn by means of the device D, which may be a Root blower or other suitable air-exhausting or air-impelling device, out through pipes A A, into pipe $b$, from whence it escapes through lateral tube $c$. Two valves, $e$ and $e^1$, are placed in tube $g$, and one, $e^2$, in tube $c$, and of the two in tube $g$ one is above its connection with pipe C, and one below the connection. Valve $e$, when closed, prevents the air ascending into tube $b$, and compels it to enter the germinating-chamber by way of pipe C. By opening valve $e$ and closing valves $e^1\ e^2$, the air introduced into the germinating-chamber may be drawn from the same and again impelled through the chamber by means of device D.

It is obvious that, by providing tube $b$ with valves, one at the bottom and the other at the top, air may be withdrawn from the germinating-room at either top or bottom, or it may be caused to circulate through the room both upward and downward at the same time, as indicated by arrows.

The tubes A A and C may extend into the germinating-chamber, the parts so extending being perforated, as indicated in Fig. 2; or tubes or channels may be formed on the side of the room, with openings into the room, as indicated in Fig. 1.

The air may be introduced into and withdrawn from the germinating-room at as many points as desired.

With reference to the connection between the device D and the tube $g$, I will state that the connection may be made by a branch tube, or, better yet, by one section of the tube $g$ opening into the bottom of the device, and the other section communicating with the interior of the device at its top. The tube $c$ connects with the tube $g$ below the device D.

Instead of using the device D, the upper part of the tube $b$ may connect with a chimney, so as to create a draft for drawing air from the germinating-room, but in such case the air in the room cannot be used to again circulate through it, as can be done by using the device D.

The grain, after it has been put into the germinating-room, can be sprinkled with the water containing the minerals used in the steeping-tank.

By the process herein described, and the apparatus for carrying out the same, the germination of the grain is accelerated, the product is increased and improved, the tendency of the grain to mold is suppressed, and the process of germination can be carried on at any season of the year.

The minerals can be used separately or combined, and, in addition to those already mentioned, liquid ammonia may be used.

Having described my invention, what I claim is—

1. The process herein described for accelerating the germination of grain for malting and seeds, the same consisting in the application of mineral and organic substances, such as named, either during the steeping or germinating process, as set forth.

2. The process herein described of impregnating grain for malting and seeds with steep-water, the same consisting in subjecting the grains or seeds, in a close tank containing the steep-water, to varying pressure, substantially as described.

3. The process herein described of brightening grain for malting and seeds, the same consisting in treating them with chlorine or ozone, substantially as described.

4. The tank T, provided with pipe or pipes for the admission of air and water into the tank, and for withdrawing air from the same, and with an opening or openings for charging and discharging the tank, substantially as described.

5. The process herein described of accelerating the germination of grain and seeds in malting, the same consisting in subjecting the grain and seeds, in a sprouting-room, to controllable currents of air, substantially as set forth.

6. The combination of the germinating-chamber, the pipes A C $b$ $c$ $g$, and device D, substantially as and for the purpose described.

7. The combination of the germinating-chamber, the pipes C and $g$, and an air impelling or exhausting device, substantially as and for the purpose described.

8. The combination of the germinating-chamber, pipe C, and pipe $g$, provided with valve $e$, and an air exhausting and impelling device, substantially as described.

9. The combination of the germinating-chamber, one or more pipes, A, pipes C $g$ $b$ $c$, and an air exhausting and impelling device, substantially as described.

10. The combination of the germinating-chamber, one or more pipes, A, pipes C, $b$, $c$, and $g$, provided with valves $e$ $e^1$, an air-impelling and an air-exhausting device, substantially as described.

11. The combination of the germinating-chamber, one or more pipes, A, pipes C, $b$, and $g$, provided with valve $e^1$, and device D, substantially as described.

12. The combination of pipes C, $b$, $g$, and $c$, provided with valves $e$, $e^1$, and $e^2$, device D, one or more pipes, A, and the germinating-chamber, substantially as described.

R. D'HEUREUSE.

Witnesses:
F. KROEOLD,
BRUNO WICK.